United States Patent Office 3,592,583
Patented July 13, 1971

3,592,583
DYEING OR PRINTING CELLULOSIC FIBERS AND SYNTHETIC HYDROPHOBIC ORGANIC SUBSTANCES WITH PHENOXYBENZANTHRONE DYES
Paul Buecheler, Reinach, Basel-Land, and Fred Mueller, Munchenstein, Basel-Land, Switzerland, assignors to Sandoz Ltd., Basel, Switzerland
No Drawing. Filed July 17, 1969, Ser. No. 842,680
Claims priority, application Switzerland, Aug. 29, 1968, 12,970/68; Nov 12, 1968, 16,828/68
Int. Cl. C09b 3/08
U.S. Cl. 8—39          6 Claims

ABSTRACT OF THE DISCLOSURE

A process for dyeing or printing textiles of hydrophobic organic substances wherein dyestuffs of the phenoxybenzanthrone series are used.

---

It has been found that dyeings and prints of high quality can be produced on fibres and textiles consisting of semi-synthetic or synthetic hydrophobic organic substances of high molecular weight by the application from aqueous dispersion of compounds of the formula

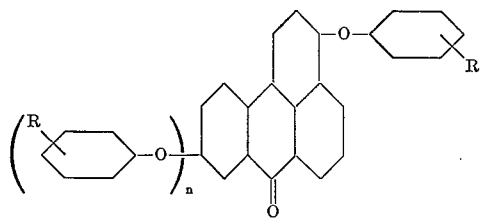

where
the two R symbols, independently of each other, stand for halogen, hydrogen, cyano, nitro, hydroxyl, optionally substituted alkyl, alkoxy, alkanoyl, benzoyl, alkanoyloxy, alkoxycarbonyl, aminocarbonyl, alkanoylamino, alkylsulphonyl, alkylaminosulphonyl or phenyl,
$n$ stands for 0 or 1 and the molecule is free from carboxylic acid or sulphonic acid radicals.

All the aforementioned alkyl and alkoxy groups contain 1, 2, 3 or 4 carbon atoms and may be substituted by halogen atoms, by which are understood preferably chlorine or bromine atoms, or by hydroxyl, alkoxy, cyano, alkylcarbonyloxy or alkoxycarbonyl groups. The aforenamed phenyl radical may bear nitro groups in addition to the substitutents referred to above.

The compounds of Formula I are generally produced by reacting one mole of a benzanthrone compound of the formula

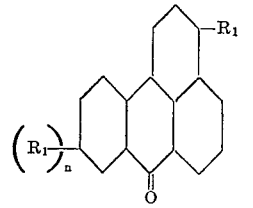

where the two $R_1$ symbols, independently of each other, represent substituents which react with phenolic hydrogen with cleavage of a compound of formula $R_1H$, with $n+1$ moles of a phenol of formula

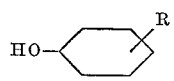

or with a mixture of compounds of this formula.

In general, sulphonic acid and nitro groups and, in particular, halogen atoms are suitable as exchangeable substituents.

The reaction is effected preferably in an inert organic solvent, e.g. nitrobenzene, chlorobenzene, xylene or a xylene mixture, or in an excess of the phenol or phenols of Formula III at a temperature in the range of 120–180° C.

It is usually of advantage to react in the presence of an acid-binding agent, e.g. an alkali carbonate, bicarbonate or acetate, and in the presence of a catalyst, e.g. copper bronze or copper chloride.

It is desirable to convert the dyes thus obtained into dye preparations before their application. They can be worked up to dye preparations by the known methods, e.g. by grinding in the presence of dispersing agents and/or fillers, with subsequent drying in a vacuum or atomizer dryer. On the addition of a suitable volume of water they can be exhaustion dyed, pad dyed or printed at long or short liquor ratio.

From aqueous dispersion the dyes build up excellently on textiles of synthetic and semi-synthetic hydrophobic organic substances of high molecular weight. They are particularly suitable for dyeing and printing textiles of linear aromatic polyesters, cellulose diacetate, cellulose triacetate and polyamide fibres; they are also dyeable on polyolefins.

The known dyeing and printing methods are employed, e.g. that described in French Pat. 1,445,371.

The dyeings are of greenish yellow shade and are very fast, having outstandingly good fastness to thermofixation, sublimation, pleating, gas fumes, cross dyeing, dry cleaning, chlorine, ozone and wet tests, such as water, washing and perspiration. They are pH- and reduction-stable and are highly stable to the pre-cure and post-cure permanent press finishing processes, are readily dischargeable and rtserve wool and cotton well. Having exceptionally good light fastness, even in pale shades, the new dyes are highly suitable as combination elements for the production of fashionable pastel shades. They are stable at temperatures up to at least 220° C. and especially in the range of 80° to 140° C. This stability is not adversely affected by the liquor ratio or by the presence of dyeing accelerants. The level dyeing properties are very good, especially on pre-set polyester materials. After an extremely long period of exposure to light the dyeings fade tone-in-tone.

In the following examples the parts and percentages are by weight and the temperatures in degrees centigrade.

EXAMPLE 1

A mixture of 7 parts of dye of the formula

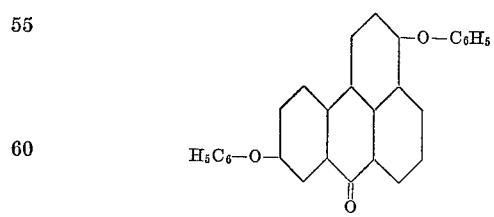

4 parts of sodium dinaphthylmethanedisulphonate, 4 parts of sodium cetylsulphate and 5 parts of anhydrous sodium sulphate is ground in a ball mill for 48 hours to form a fine powder. One part of the powder is dispersed in a little water and the dispersion runs through a sieve into a bath of 4000 parts of water containing 2 parts of sodium laurylsulphate. The liquor ratio is 1:40. At 40–50° 100 parts of a scoured fabric of polyester fibre are entered into the bath, then 20 parts of a chlorinated benzene emulsified in water are added. The bath is raised slowly to 100° and the fabric dyed for 1-2 hours at 95-100°. On removal it is rinsed, soaped, rinsed again and dried. A level lemon-yellow dyeing of good depth is obtained which has excellent fastness to light, cross dyeing, washing, water, sea water, perspiration, sublimation, gas fumes, thermofixation, fixing and permanent press finishing.

Production of the dye of this example:

400 parts of phenol are raised to 90° and mixed at this temperature with 80 parts of anhydrous calcium carbonate, 1 part of copper bronze and 1 part of copper-I-chloride. 150 parts of the compound of the formula

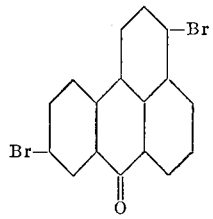

prepared by bromination of benzanthrone in chlorosulphonic acid, are entered. The reaction mixture is then raised to 135° while at the same time a weak current of hydrogen is directed through it. When no further dibromobenzanthrone is indicated in the mixture, which is the case after about 10 hours, it is cooled to 80° and 800 parts of methyl alcohol are added to it. It is then cooled further to room temperature, on which the crystalline dye is filtered off, washed with methyl alcohol and water and dried.

EXAMPLE 2

A mixture of 20 parts of the dye of the formula

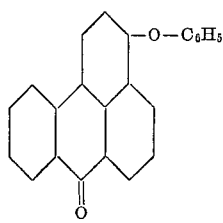

40 parts of sodium dinaphthylmethanedisulphonate, 50 parts of sodium cetylsulphate and 50 parts of anhydrous sodium sulphate are ground in a ball mill to give a dye powder. A dyebath is prepared with 4 parts of the powder and 1000 parts of water at 40–50°. 100 parts of a scoured fabric of polyester fibre are entered into the bath, which is then raised slowly to 130°. The fabric is dyed for about 1 hour at this temperature under static pressure. On removal it is rinsed, soaped, rinsed and dried. A lemon-yellow dyeing with the same fastness properties as that of Example 1 is obtained.

EXAMPLE 3

A mixture of 20 parts of dye of the formula

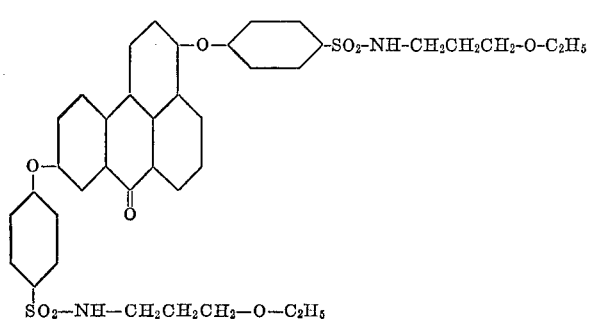

55 parts of spent sulphite cellulose lye and 800 parts of water is ground in a ball mill unitil the dye particles are less than 1 micron in size. The colloidal solution thus formed is mixed with 25 parts of ethylene diglycol-monobutlyether and 400 parts of 6% carboxymethyl cellulose. This paste is printed on polyester slubbing by the Vigoureux process, with two rollers, giving a coverage of 78%. Without intermediate drying the printed slubbing is steamed at 120°. Yellow prints with good fastness properties are obtained.

EXAMPLE 4

A mixture of 7 parts of dye of the formula

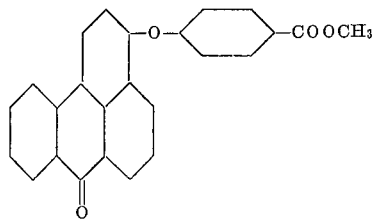

13 parts of spent sulphite cellulose lye and 100 parts of water is ground in a ball mill and the resulting paste dried in an atomizer dryer. 4 parts of the paste are dispersed in a little water and the dispersion run through a sieve into a bath of 4000 parts of water containing 4 parts of N - oleyl - N' - hydroxyethyl-N'-(3'-sulpho-2'-hydroxypropyl)-ethylenediamine. 100 parts of a fabric of nylon 66 polyamide fibre are entered into the bath at 20°, the bath is then raised to 100° in 30 minutes and the fabric dyed for 1 hour at 100°. On removal it is rinsed and dried. The yellow dyeing obtained is level and has good fastness to light, cross dyeing, washing, water, sea water, perspiration, sublimation, rubbing and solvents.

EXAMPLE 5

A fine aqueous dispersion of 30 parts of the dye employed in the procedure of Example 1, 70 parts of sodium dinaphthylmethanedisulphonate and 3 parts of sodium alginate is made up with water to 1000 parts with thorough stirring. A polyester fabric is padded with this liquor at 20°, air dried at 60–110° and the pad is dyeing fixed by exposure for 1 minute to dry heat at 230°. Subsequently the fabric is rinsed, soaped, rinsed again and dried. A fast, level lemon-yellow dyeing is obtained. Polyamide fibres can also be dyed by this procedure. The dyes of Formula I listed below, which are distinguished by the meanings of the symbols R and $n$, are applicable by exhaustion dyeing, pad dyeing and printing processes in accordance with the procedures of the foregoing examples.

| Example No.: | R | $n$ |
| --- | --- | --- |
| 6 | para-$CO-NH_2$ | 0 |
| 7 | meta-$NH-CO-CH_3$ | 0 |
| 8 | para-$SO_2-CH_3$ | 0 |
| 9 | ortho-$CO-CH_3$ | 0 |
| 10 | para-$CO-C_6H_5$ | 0 |
| 11 | ortho-$O-CO-CH_3$ | 0 |
| 12 | para-$OCH_3$ | 0 |
| 13 | para-$SO_3-NH-CH_2CH_2CH_2-OCH_3$ | 0 |
| 14 | para-$CH_3$ | 1 |
| 15 | para-$Cl$ | 1 |
| 16 | ortho-$Br$ | 1 |
| 17 | meta-$OCH_3$ | 1 |
| 18 | meta-$Cl$ | 1 |
| 19 | para-$OC_2H_5$ | 1 |
| 20 | meta-$CN$ | 1 |
| 21 | para-$NO_2$ | 1 |
| 22 | ortho-$C_6H_5$ | 1 |
| 23 | para-$C_6H_5$ | 1 |

The dyeings obtained with all these dyes are of yellow shade.

Having thus disclosed the invention what we claim is:

1. In dyeing or printing fibre or textile material made of a cellulose ester or synthetic hydrophobic organic high molecular weight substance with a dye, the improvement wherein the dye is free from carboxylic acid and sulphonic acid radicals and is of the formula

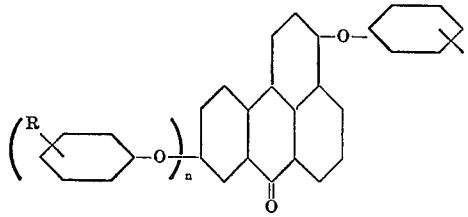

wherein each R is, independently, a member selected from the group consisting of hydrogen, halo, cyano, nitro, hydroxy, alkyl, alkoxy, alkanoyl, benzoyl, alkanoyloxy, alkoxycarbonyl, aminocarbonyl, alkanoylamino, alkylsulphonyl, alkylaminosulphonyl, substituted phenyl and unsubstituted phenyl; each alkyl and each alkoxy being either substituted or unsubstituted, any substituent thereon being selected from the group consisting of halo, hydroxy, alkoxy, cyano, alkylcarbonyloxy and alkoxycarbonyl; any substituent of substituted phenyl being selected from the group consisting of halo, hydroxy, alkoxy, cyano, alkylcarbonyloxy, alkoxycarbonyl and nitro; each alkyl and each alkoxy having from 1 to 4 carbon atoms; and $n$ is 0 or 1.

2. Fibre or textile material dyed or printed according to claim 1.

3. A process according to claim 1 wherein the dye is of the formula

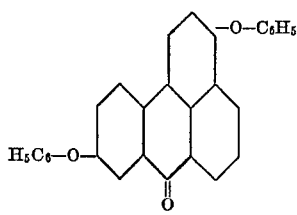

4. A process according to claim 1 wherein the dye is of the formula

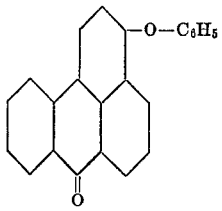

5. A process according to claim 1 wherein the dye is of the formula

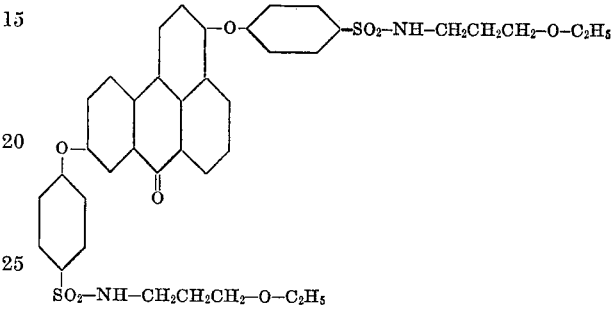

6. A process according to claim 1 wherein the dye is of the formula

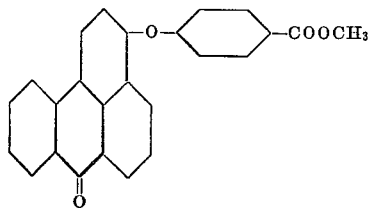

References Cited
FOREIGN PATENTS

| | | | |
|---|---|---|---|
| 133 | 9/1910 | Great Britain | 260—352 |
| 333,568 | 8/1930 | Great Britain | 260—352 |

DONALD LEVY, Primary Examiner

P. C. IVES, Assistant Examiner

U.S. Cl. X.R.

260—352

UNITED STATES PATENT OFFICE
CERTIFICATE OF CORRECTION

Patent No. 3,592,583      Dated July 13, 1971

Inventor(s) PAUL BUECHELER and FRED MUELLER

It is certified that error appears in the above-identified patent and that said Letters Patent are hereby corrected as shown below:

Column 2, line 38, "rtserve" should read --reserve--; line 67, "runs" should read --run--. Column 3, line 20, after the formula, insert a comma --,--; line 40, after the formula, insert a comma --,--. Claim 1, line 6, " 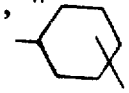 "

should read --  --.

Signed and sealed this 20th day of February 1973.

(SEAL)
Attest:

EDWARD M. FLETCHER, JR.
Attesting Officer

ROBERT GOTTSCHALK
Commissioner of Patents